United States Patent [19]

Gessell

[11] Patent Number: 4,783,512

[45] Date of Patent: * Nov. 8, 1988

[54] PROCESS FOR POLYMERIZING OLEFINS IN THE PRESENCE OF A CATALYST PREPARED FROM ORGANOMAGNESIUM COMPOUND, ORGANIC HYDROXYL-CONTAINING COMPOUND, REDUCING HALIDE SOURCE AND TRANSITION METAL COMPOUND

[75] Inventor: Donald E. Gessell, Ponca City, Okla.

[73] Assignee: The Dow Chemical Company, Midland, Mich.

[*] Notice: The portion of the term of this patent subsequent to Jul. 2, 2002 has been disclaimed.

[21] Appl. No.: 36,045

[22] Filed: Apr. 8, 1987

Related U.S. Application Data

[63] Continuation-in-part of Ser. No. 736,209, May 20, 1985, abandoned, which is a continuation-in-part of Ser. No. 604,350, Apr. 26, 1984, abandoned, which is a continuation-in-part of Ser. No. 416,422, Sep. 9, 1982, abandoned.

[51] Int. Cl.$^4$ .......................... C08F 4/64; C08F 10/00
[52] U.S. Cl. .................................... 526/142; 526/124; 526/125; 526/352
[58] Field of Search ..................... 526/124, 142

[56] References Cited

U.S. PATENT DOCUMENTS

| | | | |
|---|---|---|---|
| 3,901,863 | 8/1975 | Berger et al. | 526/124 |
| 4,199,473 | 4/1980 | Timms | 526/124 |
| 4,246,383 | 1/1981 | Gessell | 526/124 |
| 4,296,223 | 10/1981 | Berger | 526/124 |
| 4,426,316 | 1/1984 | Gessell | 502/169 |
| 4,526,943 | 7/1985 | Fuentes et al. | 526/124 |

FOREIGN PATENT DOCUMENTS

| | | |
|---|---|---|
| 007 | 12/1978 | European Pat. Off. . |
| 1275641 | 5/1972 | United Kingdom . |
| 1464909 | 2/1977 | United Kingdom . |

Primary Examiner—Edward J. Smith

[57] ABSTRACT

Olefins are polymerized in the presence of, as a catalyst therefor, the unseparated catalytic reaction product resulting from heating a mixture of
(A) at least one hydrocarbon soluble organomagnesium material;
(B) at least one organic hydroxyl-containing material;
(C) at least one reducing halide source; and
(D) at least one transition metal (Tm) compound.

7 Claims, No Drawings

PROCESS FOR POLYMERIZING OLEFINS IN THE PRESENCE OF A CATALYST PREPARED FROM ORGANOMAGNESIUM COMPOUND, ORGANIC HYDROXYL-CONTAINING COMPOUND, REDUCING HALIDE SOURCE AND TRANSITION METAL COMPOUND

CROSS REFERENCE TO RELATED APPLICATION

This application is a continuation-in-part of application Ser. No. 736,209 filed May 20, 1985 which is a continuation-in-part of application Ser. No. 604,350 filed Apr. 26, 1984 which is a continuation-in-part of application Ser. No. 416,422 filed Sept. 9, 1982 (all now abandoned).

BACKGROUND OF THE INVENTION

This invention relates to a new catalyst composition useful for initiating and promoting polymerization of one or more α-olefins and to a polymerization process employing such a catalyst composition.

It is well known that olefins such as ethylene, propylene, and 1-butene in the presence of metallic catalysts, particularly the reaction products of organometallic compounds and transition metal compounds can be polymerized to form substantially linear polymers of relatively high molecular weight. Typically such polymerizations are carried out at relatively low temperatures and pressures.

Among the methods for producing such linear olefin polymers, some of the most widely utilized are those described by Professor Karl Ziegler in U.S. Pat. Nos. 3,113,115 and 3,257,332. In these methods, the catalyst employed is obtained by admixing a compound of a transition metal of Groups 4b, 5b, 6b and 8 of Mendeleev's Periodic Table of Elements with an organometallic compound. Generally the halides, oxyhalides and alkoxides or esters of titanium, vanadium and zirconium are the most widely used transition metal compounds. Common examples of the organometallic compounds include the hydrides, alkyls and haloalkyls of aluminum, alkylaluminum halides, Grignard reagents, alkali metal aluminum hydrides, alkali metal borohydrides, alkali metal hydrides, alkaline earth metal hydrides and the like. Usually, the polymerization is carried out in a reaction medium comprising an inert organic liquid, e.g., an aliphatic hydrocarbon and the aforementioned catalyst. One or more olefins may be brought into contact with the reaction medium in any suitable manner, and a molecular weight regulator, such as hydrogen, is often added to the reaction vessel in order to control the molecular weight of the polymers. Such polymerization processes are either carried out at slurry polymerization temperatures (i.e., wherein the resulting polymer is not dissolved in the hydrocarbon reaction medium) or at solution polymerization temperatures (i.e., wherein the temperature is high enough to solubilize the polymer in the reaction medium).

Following polymerization, it is common to remove catalyst residues from the polymer by repeatedly treating the polymer with alcohol or other deactivating agent such as an aqueous basic solution. Such catalyst deactivation and/or removal procedures are expensive both in time and material consumed as well as the equipment required to carry out such treatment.

Gessell's U.S. Pat. Nos. 4,244,838 and 4,246,383 and pending applications Ser. No. 192,959 filed Oct. 1, 1980 now U.S. Pat. No. 4,496,660 and 192,960 filed Oct. 1, 1980 abandoned by Gessell, Gibbs and Fuentes, Jr., disclose catalysts prepared by employing an organic hydroxyl-containing material. However, such catalysts are directed only to the resultant solid reaction product which must be separated from the liquid portion and washed. It would be desirable to employ a catalyst which does not require the recovery of the solid reaction product and the attendant washing steps.

The present invention provides a catalyst for polymerizing α-olefins which catalysts are sufficiently efficient so as to not require their removal from the polymer and their preparation does not require recovery and washing of the solid reaction product. The present invention also provides catalysts which are useful in the preparation of narrow molecular weight distribution polyolefins, particularly polyethylenes, which have melt flow ratios (I10/I2) equal to or less than 9.00. The polyethylenes are particularly suitable for use in injection molding applications.

SUMMARY OF THE INVENTION

The present invention is directed to a catalytic product, useful for preparing polyethylenes having a narrow molecular weight distribution, resulting from (I) admixing in an inert hydrocarbon diluent and in an atmosphere which excludes moisture and oxygen
  (A) at least one hydrocarbon soluble organomagnesium material;
  (B) at least one organic hydroxyl-containing material;
  (C) at least one reducing halide source; and
  (D) at least one transition metal (Tm) compound; and (II) heating the resultant mixture at a temperature of from about 35° C. up to the boiling point of the inert hydrocarbon diluent, preferably from about 40° C. to about 100° C., for a time to permit substantial reaction of the resultant mixture as indicated by a change in color of the mixture; and wherein (1) the components are added in the order (A), (B), (C) and (D) or (A), (B), (D) and (C); and
  (2) the components are employed in quantities so as to provide the following atomic ratios Mg:Tm of from about 0.5:1 to about 50:1, preferably from about 3:1 to about 50:1, most preferably from about 5:1 to about 20:1: Cl:Mg of from about 2:1 to about 5:1, preferably from about 3.5:1 to about 4.5:1; and the OH:total number of hydrocarbyl groups attached to a metal atom in component (A) is from about 0.8:1 to about 1.2:1 and preferably from about 0.8:1 to about 1.05:1.

A further aspect of the invention is a process for polymerizing α-olefins or mixtures thereof which comprises conducting the polymerization in the presence of the aforementioned catalysts.

DESCRIPTION OF THE PREFERRED EMBODIMENTS

The organomagnesium materials which are suitably employed in the present invention include those represented by the formula $R_2Mg \cdot xMe(R')_{x'}$ wherein each R is independently a hydrocarbyl group and each R' is independently a hydrogen, hydrocarbyl or hydrocarbyloxy group, Me is Al, Zn or B, x has a value from 0 to 10 and x' has a value equal to the valence of Me.

The term hydrocarbyl as employed herein refers to a monovalent hydrocarbon group such as alkyl, cycloalkyl, aryl, aralkyl, alkenyl and similar hydrocarbon groups having from 1 to about 20 carbon atoms with alkyl having from 1 to 10 carbon atoms being preferred.

The term hydrocarbyloxy as employed herein refers to monovalent oxyhydrocarbon group such as alkoxy, cycloalkoxy, aryloxy, aralkoxy, alkenoxy and similar oxyhydrocarbon groups having from 1 to about 20 carbon atoms with alkoxy groups having from 1 to 10 carbon atoms being the preferred hydrocarbyloxy groups.

The quantity of $MeR'_{x'}$, i.e. the value of x, is preferably the minimum amount which is sufficient to render the magnesium compound soluble in the inert solvent or diluent which is usually a hydrocarbon or mixture of hydrocarbons. The value of x therefore is from zero to about 2, usually from about 0.2 to about 0.5.

Particularly suitable organomagnesium compounds include, for example, di-(n-butyl) magnesium, n-butyl-sec-butyl magnesium, diisopropyl magnesium, di-n-hexyl magnesium, isopropyl-n-butyl magnesium, ethyl-n-hexyl magnesium, ethyl-n-butyl magnesium, di-(n-octyl) magnesium, butyl octyl magnesium, butylethylmagnesium"⅓ triisobutylaluminum, di-n-hexyl magnesium"⅓ triisobutyl- aluminum and such complexes as di-n-butyl magnesium"⅓ aluminum triethyl, di-(n-butyl) magnesium"1/6 aluminum triethyl, mixtures thereof and the like.

Suitable hydroxyl-containing organic compounds include, for example, alcohols, glycols, polyoxyalkylene glycols, mixtures thereof and the like.

Suitable such compounds include those represented by the formulas

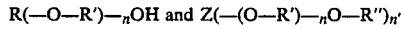

$$R(-O-R')_{-n}OH \text{ and } Z(-(O-R')-_nO-R'')_{n'}$$

wherein each R is a hydrocarbyl group having from 1 to about 20, preferably from 1 to about 10, carbon atoms or a halogen; each R' is independently a divalent hydrocarbyl group having from 1 to about 20, preferably from 1 to about 10, carbon atoms; each R" is independently hydrogen or a hydrocarbyl group having from 1 to about 20, preferably from 1 to about 10, carbon atoms, at least one of which is hydrogen; Z is a multivalent organic group containing from 2 to about 20 carbon atoms; n has a value from zero to about 10; and n' has a value of from 2 to about 10.

Particularly suitable organic hydroxyl-containing compounds include alcohols such as for example methyl alcohol, ethyl alcohol, n-propyl alcohol, isopropyl alcohol, n-butyl alcohol, sec-butyl alcohol, tert-butyl alcohol, octadecyl alcohol, glycols, 1,2-butylene glycol, 1,3-propylene glycol, 1,4-butanediol, 1,6-hexane diol, other hydroxyl-containing compounds such as, for example, glycerine, trimethylol propane, hexane triol, phenol, 2,6-di-tert-butyl-4-methylphenol, mixtures thereof and the like. Also suitable are the adducts of ethylene oxide, 1,2-propylene oxide, 1,2-butylene oxide, 2,3-butylene oxide, styrene oxide or mixtures of such oxides with the previously mentioned or other hydroxyl-containing compounds such as pentaerythritol, sucrose, sorbitol and the like, as well as the alkyl and aryl capped hydroxyl-containing compounds so long as there remains at least 1 hydroxyl group per molecule.

Suitable reducing halide sources include those represented by the formulas

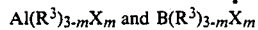

$$Al(R^3)_{3-m}X_m \text{ and } B(R^3)_{3-m}X_m$$

including mixtures thereof wherein each $R^3$ is independently hydrogen or a hydrocarbyl group as hereinbefore defined, and m has a value from 1 to 2.

Particularly suitable reducing halides include, for example, ethylaluminum dichloride, diethylaluminum chloride, ethylaluminum sesquichloride, ethylboron dichloride, diethylboron chloride, mixtures thereof and the like.

Suitable transition metal compounds which can be employed include those represented by the formula $TmY_nX_{z-n}$, wherein Tm is a transition metal in its highest stable valence state and being selected from groups IV-B, V-B and VI-B of the Periodic Table of the Elements; Y is oxygen, OR" or N(R")$_2$; R" is hydrogen or a hydrocarbyl group having from 1 to about 20 carbon atoms: X is a halogen, preferably chlorine or bromine; z has a value corresponding to the valence of the transition metal, Tm; n has a value of from zero to 5 with the value of z-n being from zero up to a value equal to the valence state of the transition metal, Tm.

Particularly suitable transition metal compounds include, for example, titanium tetrachloride, titanium tetrabromide, dibutoxy titanium dichloride, monoethoxy titanium trichloride, isopropoxytitanium trichloride, tetraisopropoxytitanium, tetra-n-propoxytitanium, tetra-n-butoxytitanium, chromyl chloride, vanadium oxytrichloride, zirconium tetrachloride, tetrabutoxyzirconium, vanadium tetrachloride, mixtures thereof and the like.

Suitable organic inert diluents in which the catalyst can be prepared and in which the α-olefin polymerization can be conducted include, for example, liquefied ethane, propane, isobutane, n-butane, isopentane, n-pentane, n-hexane, the various isomeric hexanes, isooctane, paraffinic mixtures of alkanes having from 8 to 12 carbon atoms, cyclohexane, methylcyclopentane, dimethylcyclohexane, dodecane, eicosane industrial solvents composed of saturated or aromatic hydrocarbons such as kerosene, naphthas, etc., especially when freed of any olefin compounds and other impurities, and especially those having boiling points in the range from about −50° to about 200° C. Also included as suitable inert diluents are benzene, toluene, ethylbenzene, cumene, decalin and the like.

Suitable cocatalysts or activators with which the catalysts of the present invention can be reacted, contacted or employed in the polymerization of α-olefins includes those aluminum, boron, zinc or magnesium compounds represented by the formulas $Al(R^3)_{3-a}X'_a$, $B(R^3)_{3-a}X'_a$, $Mg(R^3)_2$, $MgRX'$, $Zn(R^3)_2$ or mixtures thereof wherein R is as previously defined; X' is a halogen, preferably chlorine or bromine; and a has a value of from zero to 2, preferably zero to 1 and most preferably zero.

Particularly suitable cocatalysts or activators include, for example, diethylaluminum chloride, ethylaluminum dichloride, diethylaluminum bromide, triethylaluminum, triisobutylaluminum, diethylzinc, dibutylmagnesium, butylethylmagnesium, butylmagnesium chloride, diisobutylaluminum hydride, isoprenylaluminum, triethylboron, trimethylaluminum, mixtures thereof and the like.

The cocatalysts or activators are employed in quantities such that the atomic ratio of the Al, B, Mg, Zn or mixtures thereof to Tm is from about 0.1:1 to about 1000:1, preferably from about 5:1 to about 500:1 and most preferably from about 10:1 to about 200:1.

The catalyst and cocatalyst or activator may be added separately to the polymerization reactor or they may be mixed together prior to addition to the polymerization reactor.

Olefins which are suitably homopolymerized or copolymerized in the practice of this invention are generally any one or more of the aliphatic α-olefins such as, for example, ethylene, propylene, butene-1, pentene-1, 3-methylbutene-1, 4-methylpentene-1, hexene-1, octene-1, dodecene-1, octadecene-1, 1,7-octadiene and the like. It is understood that α-olefins may be copolymerized with one or more other α-olefins and/or with small amounts i.e., up to about 25 weight percent based on the polymer of other polymerizable ethylenically unsaturated monomers such as styrene, α-methylstyrene and similar ethylenically unsaturated monomers which do not destroy conventional Ziegler catalysts. Most benefits are realized in the polymerization of aliphatic α-monoolefins, particularly ethylene and mixtures of ethylene and up to 50 weight percent, especially from about 0.1 to about 40 weight percent of propylene, butene-1, hexene-1, octene-1, 4-methylpentene-1, 1,7-octadiene or similar α-olefin or a diolefin based on total monomer.

In the polymerization process employing the aforementioned catalytic reaction product, polymerization is effected by adding a catalytic amount of the catalyst composition to a polymerization zone containing α-olefin monomer, or vice versa. The polymerization zone is maintained at temperatures in the range from about 0° to about 300° C., preferably at slurry polymerization temperatures, e.g., from about 0° to about 95° C., more preferably from about 50° to about 90° C., for a residence time of from about 15 minutes to about 24 hours, preferably from about 30 minutes to about 8 hours. It is generally desirable to carry out the polymerization in the absence of moisture and oxygen and a catalytic amount of the catalytic reaction product is generally within the range from about 0.0001 to about 0.1 milligram-atoms transition metal per liter of diluent. It is understood, however, that the most advantageous catalyst concentration will depend upon polymerization conditions such as temperature, pressure, diluent and presence of catalyst poisons and that the foregoing range is given to obtain maximum catalyst yields. Generally in the polymerization process, a carrier which may be an inert organic diluent or excess monomer is generally employed. In order to realize the full benefit of the high efficiency catalyst of the present invention care must be taken to avoid oversaturation of the diluent with polymer. If such saturation occurs before the catalyst becomes depleted, the full efficiency of the catalyst is not realized. For best results, it is preferred that the amount of polymer in the carrier not exceed about 50 weight percent based on the total weight of the reaction mixture.

It is understood that inert diluents employed in the polymerization recipe are suitable as defined hereinbefore.

The polymerization pressures preferably employed are relatively low, e.g., from about 10 to about 500 psig. However, polymerization within the scope of the present invention can occur at pressures from atmospheric up to pressures determined by the capabilities of the polymerization equipment. During polymerization it is desirable to agitate the polymerization recipe to obtain better temperature control and to maintain uniform polymerization mixtures throughout the polymerization zone.

Hydrogen is often employed in the practice of this invention to control the molecular weight of the resultant polymer. For the purpose of this invention, it is beneficial to employ hydrogen in concentrations ranging from about 0 to about 80 volume percent in the gas or liquid phase in the polymerization vessel. The larger amounts of hydrogen within this range are found to produce generally lower molecular weight polymers. It is understood that hydrogen can be added with a monomer stream to the polymerization vessel or separately added to the vessel before, during or after addition of the monomer to the polymerization vessel, but during or before the addition of the catalyst. Using the general method described, the polymerization reactor may be operated liquid full or with a gas phase and at solution or slurry polymerization conditions.

The monomer or mixture of monomers is contacted with the catalytic reaction product in any conventional manner, preferably by bringing the catalyst composition and monomer together with intimate agitation provided by suitable stirring or other means. Agitation can be continued during polymerization. In the case of more rapid reactions with more active catalysts, means can be provided for refluxing monomer and solvent, if any of the latter is present and thus remove the heat of reaction. In any event, adequate means should be provided for dissipating the exothermic heat of polymerization, e.g., by cooling reactor walls, etc. If desired, the monomer can be brought in the vapor phase into contact with the catalytic reaction product, in the presence or absence of liquid material. The polymerization can be effected in a batch manner, or in a continuous manner, such as, for example, by passing the reaction mixture through an elongated reaction tube which is contacted externally with suitable cooling medium to maintain the desired reaction temperature, or by passing the reaction mixture through an equilibrium overflow reactor or a series of the same.

The polymer is readily recovered from the polymerization mixture by driving off unreacted monomer and solvent if any is employed. No further removal of impurities is required. Thus, a significant advantage of the present invention is the elimination of the catalyst residue removal steps. In some instances, however, it may be desirable to add a small amount of a catalyst deactivating reagent. The resultant polymer is found to contain insignificant amounts of catalyst residue.

The following examples are given to illustrate the invention, and should not be construed as limiting its scope. All parts and percentages are by weight unless otherwise indicated.

In the following examples, the melt index values $I_2$ and $I_{10}$ were determined by ASTM D 1238 conditions E and N respectively. The flow rate ratio, FRR or $I_{10}/I_2$ is a dimensionless number derived by dividing the flow rate at condition N by the flow rate at condition E and is discussed in section 7.3 of ASTM D 1238. One skilled in the art recognizes that melt flow ratios are good indicators of molecular weight distribution. Small changes in these ratios can dramatically affect injection molding applictions, see Berger et al, U.S. Pat. No. 3,392,213. The apparent bulk density was determined according to the procedure of ASTM 1895 employing a paint volumeter from the Sargent-Welch Scientific Company (catalog no. S-64985) as the cylinder instead of the one specified by the ASTM procedure.

GENERAL PROCEDURE

In each of the following examples, unless otherwise stated, the catalyst components were blended while in a gloved box filled with dry oxygen-free nitrogen.

In the examples, the dibutylmagnesium was a commercial material obtained as a solution in a heptane-hexane mixture from the Lithium Corporation of America, the dihexylmagnesium was a commercial material obtained as a hexane solution from the Ethyl Corporation, and the butylethylmagnesium was a commercial material obtained as a heptane solution from Texas Alkyls, Inc. All ratios are molar ratios unless otherwise indicated. The 1.46 molar diethylaluminum chloride, 0.616 molar triisobutylaluminum and 0.921 molar triethylaluminum were obtained as solutions in hexane from Ethyl Corporation or Texas Alkyls, Inc.

PREPARATION OF STOCK SOLUTION A

In a dry box filled with dry, oxygen-free nitrogen, a stock solution of a hydrocarbon soluble magnesium complex was prepared by consecutively mixing while stirring 628 ml of 0.637 molar butylethylmagnesium (400 mmoles) 325 ml of 0.616 molar triisobutylaluminum (200.2 mmoles) and the dropwise addition of 105.3 ml of neat n-propyl alcohol (1408.9 mmoles). An exotherm was observed upon addition of the n-propyl alcohol and the temperature was maintained at about 40° C. by controlling addition rate. The resultant mixture was allowed to cool to room temperature. Since some of the hexane was lost through evaporation, the volume was then adjusted to 800 ml by the addition of hexane. The resultant stock solution was water white with no visible particulates and was 0.5 molar with respect to magnesium.

PREPARATION OF STOCK SOLUTION B

A stock solution of a hydrocarbon soluble magnesium complex was prepared by mixing 148.8 ml of 0.84 molar di-n-hexylmagnesium (125 mmoles), 101.5 ml of 0.616 molar triisobutylaluminum (62.5 mmoles) and 32.8 ml of neat n-propylalcohol (437.5 mmoles). An exotherm was observed during the n-propyl alcohol addition and the temperature was maintained at about 40° C. by controlling the rate of addition. The solution was diluted with n-hexane such that the resultant volume was 500 ml and was 0.25 molar with respect to magnesium.

PREPARATION OF STOCK SOLUTION C

A stock solution of a hydrocarbon soluble magnesium complex was prepared by mixing 78.5 ml of 0.637M butylethylmagnesium (50 mmoles), 40.6 ml of 0.616M triisobutylaluminum (25 mmoles) and 10.2 ml of neat absolute ethanol (175 mmoles) diluted to 30 ml with hexane. An exotherm was observed during the ethanol addition and the temperature was maintained at about 40° C. by controlling the rate of addition of the ethanol. The solution was diluted with hexane so that the resultant volume was 300 ml and was 0.167M with respect to magnesium.

EXAMPLE 1

A. Preparation of Catalyst

To a stirred 500 ml beaker containing 75 ml of magnesium stock solution A (37.5 mmoles Mg) and 100 ml of n-hexane were added 3.72 ml of 3.34 molar tetraisopropoxytitanium (12.5 mmoles). No color change was observed and the mixture remained a solution. Then 49 ml of 1.53 molar ethylaluminum dichloride (75 mmoles) in n-hexane were added dropwise. A very pale yellow slurry resulted upon completion of the ethylaluminum dichloride addition. The slurry was heated to 65°–70° C. for one hour (3600 s) resulting in a tan colored slurry with a brown supernatant liquid.

B. Polymerization

To a stirred 1.8 liter autoclave was added 1 liter of dry, oxygen-free n-hexane. While maintaining a small nitrogen purge, 1.1 ml of 0.921 molar triethylaluminum were added followed by an aliquot of the catalyst prepared in A above containing 0.005 mmoles of titanium. The reactor was sealed, purged with hydrogen and heated to 85° C. Hydrogen was then added so that the reactor pressure was 50 psig (345 kPa) at 85° C. Ethylene was introduced into the reactor and was employed to maintain a total reactor pressure of 170 psig (1172 kPa). After 2 hours (7200 s), the reactor was cooled to room temperature and vented. The reactor seal was broken and the contents were filtered, air-dried and then dried under vacuum overnight at about 70° C. The yield of dry polyethylene powder was 127 g. The properties and efficiency were:

melt index ($I_2$): 2.21
melt flow ratio ($I_{10}/I_2$): 8.0
bulk density, lbs/ft$^3$ (kg/m$^3$): 17.2 (276)
catalyst efficiency, g PE/g Ti: 529,000

COMPARATIVE EXPERIMENT A

A. Catalyst Preparation

To a stirred 500 ml beaker containing 75 ml of magnesium stock solution A (37.5 mmoles Mg) and 100 ml of n-hexane were added 3.72 ml of 3.36 molar tetraisopropoxytitanium (12.5 mmoles). No color change was observed and the mixture remained a solution. Then 49 ml of 1.53 molar ethylaluminumdichloride (75 mmoles) were added dropwise resulting in a pale yellow slurry. No heat was applied during preparation of this catalyst.

B. Polymerization

1. In a manner similar to Example (1-B), ethylene was polymerized with the catalyst prepared in (A) above employing the following components. 3.26 ml of 0.921 molar (3 mmoles) triethylaluminum and an aliquot of catalyst from (A) aged at room temperature for 1.7 hours (6120 s) containing 0.015 mmole Ti were employed. The polymerization resulted in 66 g of dried polymer having a melt index of 0.21, an $I_{10}/I_2$ of 6.8 and a bulk density of 9.9 lbs/ft$^3$ (159 kg/m$^3$). The catalyst efficiency was 92,000 g polymer/g Ti.

2. Another polymerization was made employing the procedure of Example (1-B) using 2.17 ml of 0.921 (2 mmoles) of triethylaluminum and an aliquot of the catalyst prepared in (A) above which had been aged for 24 hours (86.4 ks) at room temperature and contained 0.01 mmole of titanium. The polymerization activity was complete after 1.25 hours (4500 s) as indicated by zero ethylene flow into the reactor. The polymerization produced 25 g of dried polymer having a melt index ($I_2$) of 0.15, an $I_{10}/I_2$ of 9.1 and a bulk density of 11.6 lbs/ft$^3$ (186 kg/m$^3$). The catalyst efficiency was 32,000 g polymer/g Ti.

EXAMPLE 2

A. Catalyst Preperation

To a 100 ml aliquot of magnesium stock solution B containing 25 mmoles di-n-hexylmagnesium, 12.5 mmoles tri-isobutylaluminum and 87.5 mmoles n-propyl alcohol was added 0.37 ml of 3.36M tetraisopropoxytitanium (1.24 mmoles). The solution remained water white. Then 32.6 ml of 1.53 molar ethylaluminumdichloride (49.9 mmoles) were added dropwise. The resultant white slurry was heated for 30 minutes (1800 seconds) at 65° C. resulting in a purplish tan colored slurry. The Mg/Ti ratio of this catalyst was 20/1.

B. Polymerization

Employing the procedure of Example (1-B) ethylene was polymerized using 1.1 ml of 0.616 molar trisobutylaluminum (0.68 mmoles) and an aliquot of the catalyst prepared in (A) above containing 0.0035 mmoles Ti. A two hour (7200 s) polymerization produced 91 g of dried polymer having a melt index ($I_2$) of 0.37, an $I_{10}/I_2$ of 7.5 and a bulk density of 11.1 lbs/ft$^3$ (178 kg/m$^3$). The efficiency was 541,000 g polymer/g Ti.

EXAMPLE 3

A. Catalyst Preparation

To a stirred 500 ml beaker were added 100 ml of 0.637 molar butylethylmagnesium (63.7 mmoles), 53 ml of 0.616 molar triisobutylaluminum (32.6 mmoles), 17.3 ml of neat n-propyl alcohol (230.8 mmoles) and 1.9 ml of neat tetraisopropoxytitanium (6.38 mmoles). Then 90 ml of 1.53 molar ethylaluminumdichloride (137.7 mmoles) were added at 65° C. over a period of about two hours (7200 s). The resultant catalyst slurry was reddish in color and the Mg/Ti ratio was 10/1.

B. Polymerization

Employing the procedure of example (1-B), a two hour (7200 s) polymerization was conducted using 1 3 ml of 0.616 molar triisobutylaluminum (0.8 mmoles) and an aliquot of catalyst containing 0.004 mmole Ti prepared in (A) above. The polymerization produced 142 g of dried polymer having a melt index ($I_2$) of 1.8, an $I_{10}/I_2$ of 7.7 and a bulk density of 20.5 lbs/ft$^3$ (327 kg/m$^3$). The catalyst efficiency was 730,000 g polymer/g Ti.

C. Polymerization

Employing the procedure of Example (1-B), a two hour (7200 s) polymerization was conducted using 0.9 ml of 0.921 molar triethylaluminum (0.83 mmoles) and an aliquot of the catalyst prepared in (A) above containing 0.004 mmoles of Ti. The polymerization produced 282 g of dried polymer having a melt index ($I_2$) of 1.5, an $I_{10}/I_2$ of 7.8 and a bulk density of 22.5 lbs/ft$^3$ (360 kg/m$^3$). The catalyst efficiency was 1,190,000 g polymer/g Ti.

EXAMPLES 4 TO 9

A. Catalyst Preparation

Several catalysts were prepared by adding sequentially to a 500 ml beaker in a dry, oxygen-free atmosphere the following:
(1) 75 ml of stock solution A containing 37.5 mmoles butylethylmagnesium, 18.75 mmoles of triisobutylaluminum and 132 mmoles of n-propyl alcohol;
(2) a titanium compound;
(3) 49 ml of 1.53 molar ethylaluminumdichloride (75 mmoles).

The mixture was then heated to about 70° C. for 1-1-½ hours (5400 s). The catalyst preparation variables are given in Table I.

B. Polymerization

The various catalysts prepared in (A) above were employed in the polymerization of ethylene employing the procedure of Example (1-B). The variables and results are given in Table II.

TABLE I

| EXAMPLE NUMBER | Ti COMPOUND | mmoles Ti | Mg:Ti |
|---|---|---|---|
| 4 | Ti(OiPr)$_4$* | 18.75 | 2:1 |
| 5 | Ti(OiPr)$_4$ | 37.5 | 1:1 |
| 6 | Ti(OiPr)$_4$ | 75 | 0.5:1 |
| 7 | TiCl$_4$ | 12.4 | 3:1 |
| 8 | TiCl$_4$ | 37.5 | 1:1 |
| 9 | TiCl$_4$ | 75 | 0.5:1 |

*tetraisopropoxytitanium

TABLE II

| | EXAMPLE NO. | | | | | |
|---|---|---|---|---|---|---|
| | 4 | 5 | 6 | 7 | 8 | 9 |
| H Pressure, psig (kPa) | 50(345) | 50(345) | 50(345) | 50(345) | 50(345) | 50(345) |
| Ti, mmoles | 0.020 | 0.010 | 0.050 | 0.005 | 0.005 | 0.010 |
| ATE*, mmoles | 1.000 | 20.000 | 2.500 | 1.000 | 1.000 | 0.500 |
| Polymer produced, grams | 121 | 155 | 43 | 191 | 73 | 110 |
| Melt Index, $I_2$ | 1.9 | 1.5 | 6.4 | 7.6 | 2.7 | 1.9 |
| Melt Flow Ratio, $I_{10}/I_2$ | 9.1 | 7.9 | 7.6 | 7.8 | 7.4 | 8.5 |
| Bulk Density, lbs/ft$^3$ (Kg/m$^3$) | 15.6(250) | 11(176) | 9.5(152) | 22.4(359) | 18.3(293) | 13.4(215) |
| Efficiency, g/polymer/g Ti | 126.000 | 32,000 | 18,000 | 797,000 | 305,000 | 230,000 |

*triethyl aluminum

EXAMPLE 10

A. Catalyst Preparation

A solution was prepared by consecutively mixing, while stirring, 33.8 ml of 0.74M butyloctylmagnesium (25 mmoles), 2.4 ml of 2.05M trioctylaluminum (5 mmoles) and 50 ml of dry n-hexane. To this solution, 9.9 ml of neat n-decylalcohol (52 mmoles) diluted to 50 ml with n-hexane were added dropwise. An exotherm was observed during the addition of the n-decylalcohol and the temperature was maintained at about 40° C. by controlling the rate of addition. The resultant mixture was allowed to cool to room temperature. To this mixture, 1.43 ml of 1.75M tetraisoproxytitanium decamer (2.5 mmoles) were added followed by dropwise addition of 22.6 ml of 1.47M ethylaluminum sesquichloride (33.3 mmoles). An additional 50 ml of dry hexane were added to the mixture and it was heated for 1 hour (3600 s) at about 65° C. The volume of the solution was maintained constant by additions of hexane during the heating period.

B. Polymerization

To a stirred 2.5 l stainless steel reactor containing 1.6 l of dry, oxygen free hexane, was added 4.4 ml of 0.92M triethylaluminum in hexane. An aliquot of the catalyst prepared in (10 A) above containing 0.020 mmoles of titanium was added to the reactor. The atomic ratio of Al:Ti was 200:1. The reactor nitrogen atmosphere was replaced with hydrogen by purging, the reactor contents were heated to 85° C. and the reactor pressure adjusted to 70 psig (483 kPa) with hydrogen. Ethylene was added to maintain a reactor pressure of 170 psig (1172 kPa). After two hours (7200 s) at 85° C., the reactor contents were filtered and the polyethylene dried in a vacuum overnight at about 60° C. The yield of polyethylene was 86.6 g. The melt index, $I_2$, was 1.31 with an $I_{10}/I_2$ of 8.79. The bulk density was 6.8 lbs/ft$^3$ (0.109 g/cc). The catalyst efficiency was 90,400 g PE/g Ti.

EXAMPLE 11

A. Catalyst Preparation

A solution was prepared by consecutively mixing, while stirring, 33.8 ml of 0.74M butyloctylmagnesium (25 mmoles), 54.3 ml of 0.921M triethylaluminum (50 mmoles) and 50 ml dry n-hexane. To this solution, 8.2 ml of neat methanol (200 mmoles) diluted to 50 ml with hexane were added dropwise. An exotherm was observed during the addition of the methanol and the temperature was maintained at about 40° C. by controlling the rate of addition. The resultant mixture was allowed to cool to room temperature. To this mixture, 0.17 ml of 2.93M tetra-n-butoxytitanate (0.5 mmole) was added followed by dropwise addition of 56.4 ml of 1.47M ethylaluminum sesquichloride (83 mmoles). An additional 50 ml of dry hexane were added to the mixture and it was heated to 1 hour (3600 s) at about 65° C. The volume of the solution was maintained constant by additions of hexane during the heating period.

B. Polymerization

In a manner similar to Example (10-B) ethylene was polymerized with the catalyst prepared in (11-A) above employing the following components: 0.87 ml of 0.92M triethylaluminum and an aliquot of the catalyst from (11-A) containing 0.004 mmoles Ti. The polymerization resulted in 489 g of dried polyethylene having a melt index, $I_2$, of 9.3, an $I_{10}/I_2$ of 8.02 and a bulk density of 24.1 lbs/ft$^3$ (0.386 g/cc). The catalyst efficiency was 2,551,000 g PE/g Ti.

EXAMPLE 12

A. Preparation of Catalyst

To a stirred 500 ml beaker containing 150 ml of magnesium stock solution C (25 mmoles Mg) were added 0.3 ml of 1.68M tetraisopropoxytitanium (0.5 mmole). Then 32.7 ml of 1.53M ethylaluminum dichloride (50 mmoles) were added dropwise. The resulting slurry was heated to about 65° C. for 1 hour (3600 s) to produce the catalyst. The volume of the solution was maintained constant by additions of hexane during the heating period.

B. Polymerization

In a manner similar to Example (10-B) ethylene was polymerized with the catalyst prepared in (12-A) above employing the following components: 0.44 ml of 0.92M triethylaluminum and an aliquot of the catalyst from (12-A) containing 0.002 mmoles Ti. The Al:Ti atomic ratio was 200:1. The polymeriation resulted in 500.2 g of dried polyethylene having a melt index, $I_2$, of 7.91, an $I_{10}/I_2$ of 8.16, and a bulk density of 21.8 lbs/ft$^3$ (0.349 g/cc). The catalyst efficiency was 5.22 x 10$^6$ g PE/g Ti.

EXAMPLE 13

A. Preparation of Catalyst

To a stirred 500 ml beaker containing 150 ml of magnesium stock solution C (25 mmoles Mg) were added 14.9 ml of 1.68M tetraisopropoxytitanium (25 mmoles). Then 32.7 ml of 1.53M ethylaluminum dichloride (50 mmoles) were added dropwise. The resulting slurry was heated to about 65° C. for 1 hour (3600 s) to produce the catalyst. The volume of the solution was maintained relatively constant by addition of hexane during the heating period.

B. Polymerization

In a manner similar to Example (10-B) ethylene was polymerized with the catalyst prepared in (13-A) above employing the following components: 11.0 ml of 0.92M triethylaluminum and an aliquot of the catalyst from (A) containing 0.050 mmoles Ti. The Al:Ti atomic ratio was 200:1. The polymerization resulted in 100.7 g of dried polyethylene having a melt index, $I_2$, of 1.97, an $I_{10}/I_2$ of 7.94, and a bulk density of 12.9 lbs/ft$^3$ (0.207 g/cc). The catalyst efficiency was 210,000 g PE/g Ti.

COMPARATIVE EXPERIMENT B

A. Catalyst Preparation

To a stirred 500 ml beaker containing 100 ml of dry n-hexane were added 5.99 g of powdered magnesium ethoxide (52.3 mmoles). Then 0.62 ml of 1.68M tetraisopropoxytitanium (1.05 mmoles) were added followed by dropwise addition of 68.3 ml of 1.53M ethylaluminum dichloride. The resultant slurry was heated for 1 hour (3600 s) at about 65° C. to produce a catalyst. At no time during the preparation was the reaction mixture completely in solution. The volume of the solution was maintained relatively constant by addition of hexane during the heating period.

B. Polymerization

In a manner similar to Example (10 B) ethylene was polymerized with the catalyst prepared in Comp. Ex. B-A above employing the following components: 0.88 ml of 0.92M triethylaluminum and a representative aliquot of the catalyst from Comp. Ex. B1 containing 0.004 mmoles Ti. The Al:Ti atomic ratio was 200:1. The polymerization resulted in 249 g of dried polyethylene having a melt index, $I_2$, of 1.41, an $I_{10}/I_2$ of 10.2, and a bulk density of 16.6 lbs/ft$^3$ (0.266 g/cc). The catalyst efficiency was 1,297,000 g PE/g Ti.

COMPARATIVE EXPERIMENT C

A. Catalyst Preparation

To a stirred 500 ml beaker containing 100 ml of dry n-hexane were added 7.77 g of powdered magnesium ethoxide (67.8 mmoles). Then 40.4 ml of 1.68M tetraisopropoxytitanium (67.8 mmoles) were added followed by dropwise addition of 88.6 ml of 1.53M ethylaluminum dichloride (135.6 mmoles). The resultant slurry was heated for 1 hour (3600 s) at about 65° C. to produce a catalyst. At no time during the preparation was the reaction mixture completely in solution. The volume of the solution was maintained relatively constant by addition of hexane during the heating period.

B. Polymerization

In a manner similar to Example (10-B) ethylene was polymerized with the catalyst prepared in Comp. Ex. C-A above employing the following components: 3.3 ml of 0.92M triethylaluminum and a representative aliquot of the catalyst from Comp. Ex. C-A containing 0.015 mmoles Ti. The Al:Ti atomic ratio was 200:1. The polymerization resulted in 91.4 g of dried polyethylene having a melt index, $I_2$, of 1.81, an $I_{10}/I_2$ of 7.6, and a bulk density of 13.8 lbs/ft$^3$ (0.221 g/cc). The catalyst efficiency was 127,200 g PE/g Ti.

The Mg/Ti, Cl/Mg, and OH/total number of hydrocarbyl groups (TNHG) attached to the metal atom ratios for each of the examples and comparative experiments are given in the following Table III.

TABLE III

| Ex. or Comp. Expt. No. | Mg/Ti Ratio | Al/Mg Ratio[1] | Cl/Mg Ratio[2] | OH/TNHG Ratio[3] |
|---|---|---|---|---|
| 1 | 3:1 | 0.5:1 | 4:1 | 1:1 |
| A* | 3:1 | 0.5:1 | 4:1 | 1:1 |
| 2 | 20:1 | 0.5:1 | 4:1 | 1:1 |
| 3 | 10:1 | 0.5:1 | 4:3 (1.3:1) | 1:1 |
| 4 | 2:1 | 0.5:1 | 4:1 | 1:1 |
| 5 | 1:1 | 0.5:1 | 4:1 | 1:1 |
| 6 | 0.5:1 | 0.5:1 | 4:1 | 1:1 |
| 7 | 3:1 | 0.5:1 | 4:1 | 1:1 |
| 8 | 1:1 | 0.5:1 | 4:1 | 1:1 |
| 9 | 0.5:1 | 0.5:1 | 4:1 | 1:1 |
| 10 | 10:1 | 0.2:1 | 2:1 | 0.8:1 |
| 11 | 50:1 | 2:1 | 5:1 | 1:1 |
| 12 | 50:1 | 0.5:1 | 4:1 | 1:1 |
| 13 | 1:1 | 0.5:1 | 4:1 | 1:1 |
| B* | 50:1 | — | 4:1 | — |
| C* | 1:1 | — | 4:1 | — |
| 14 | 10:1 | 0.5:1 | 4:1 | 1:1 |
| 15 | 5:1 | 0.5:1 | 4:1 | 1:1 |
| 16 | 50:1 | — | 3.5:1 | 1:1 |
| 17 | 3:1 | — | 4.5:1 | 1:1 |
| D* | 5:1 | — | 4:1 | — |
| E* | 50:1 | — | 3.5:1 | — |
| F* | 3:1 | — | 4.5:1 | — |

[1] This is the Al/Mg ratio in Component A, MgR$_2$.xAl(R')$_3$.
[2] The Cl for this ratio is from the reducing aluminum halide source.
[3] This is the ratio of OH groups from the alcohol to the total number of hydrocarbyl groups originally attached to the metals in component A. Thus, a OH/TNHG ratio of 1 means that essentially there are no hydrocarbyl groups attached to the metal toms in Component A after the addition of Component B, the alcohol.

EXAMPLE 14

A. Catalyst Preparation

A solution was prepared by consecutively mixing, while stirring, 78.4 ml of 0.637M butylethylmagnesium (50 mmoles), 40.6 ml of 0.616M triisobutylaluminum (25 mmoles). To this solution 13.1 ml of neat n-propylalcohol (175 mmoles) diluted with 20 ml of n-hexane were added dropwise. An exotherm was observed during the addition of the n-propylalcohol and the temperature was maintained at about 40° C. by controlling the rate of addition. The resultant mixture was allowed to cool to about 22° C. To an aliquot of this solution containing 25 mmoles Mg were added 1.49 ml of 1.68M tetraisopropoxytitanate (2.5 mmoles) followed by the dropwise addition of 28.2 ml of 1.77M isobutylaluminum dichloride (50 mmoles). An additional 50 ml of dry hexane were added to the mixture and it was heated for 1 hour (3600 s) at about 65° C. The volume of the solution was maintained constant by additions of hexane during the heating period.

B. Polymerization

In a manner similar to Example (10-B) ethylene was polymerized with the catalyst prepared in (14-A) above employing the following components: 0.87 ml of 0 92M triethylaluminum and an aliquot of the catalyst from (14-A) containing 0.004 mmoles Ti. The polymerization resulted in 153.6 g of dried polyethylene having a melt index, $I_2$, of 1.62, an $I_{10}/I_2$ of 8 18, and a bulk density of 14.0 lbs/ft$^3$ (0.224 g/cc). The catalyst efficiency was 801,670 g Pe/g Ti. The polymer had a HLMI (ASTM D-1238 79) of 46.8 and a HLMI/MI or HLMI/$I_2$ of 28.9.

EXAMPLE 15

A. Catalyst Preparation

To a stirred solution of 78.5 ml of 0.637M butylethylmagnesium (50.0 mmoles) and 40.6 ml of 0.616 M triisobutylaluminum (ATB) (25.0 mmoles), a solution consisting of 10.2 ml of ethyl alcohol (175 mmoles) and 10.0 ml of hexane was added dropwise so as to maintain a temperature of 60° C. To the resulting colorless solution, 5.7 ml of 1.75M tetraisopropyltitanium (10.0 mmoles) was added. The solution remained colorless. Next, 65.4 ml of 1.53M ethylaluminum dichloride (100.0 mmoles) were added dropwise at a temperature of about 24° C. The catalyst was heated at about 70° C. for 135 minutes (8100 s) prior to use. A brown slurry resulted. The Mg:Ti atomic ratio is 5.0:1 and the Cl:Mg atomic ratio is 4.0:1. The ratio of ROH to R groups is 1:1.

B. Polymerization

An aliqot of catalyst prepared in Example (15-A) above, containing 0.0102 mmoles of titanium was added to a 2.5 liter stirred stainless steel reactor containing 1.5 liters of dry, oxygen-free hexane and 2.18 ml of 0.921M triethylaluminum, (ATE) in hexane. The Al:Ti atomic ratio for the cocatalyst was 200:1. The reactor nitrogen atmosphere was replaced with hydrogen by purging, the reactor contents were heated to 85° C. and the reactor pressure was adjusted to 70 psig (482.6 kPa) with hydrogen. Ethylene was introduced into the reactor and was employed to maintain a total reactor pressure of 170 psig (1172 kPa). After 2 hours (7200 s) at 85° C., the reactor was cooled to room temperature and vented. The reactor contents were removed, filtered and dried under vacuum. The dried polyethylene weighed 425 g, had a melt index, $I_2$, of 4.25 and a bulk density of 20.6 lbs/ft$^3$ (0.3296 g/cm. The catalyst efficiency was 868,000 g PE/g Ti.

EXAMPLE 16

A. CATALYST PREPARATION

To 81.2 ml of a 0.616M solution of butylethylmagnesium (50 mmoles) were added 5.87 ml of absolute ethanol (100 mmoles), dropwise so as to maintain temperature of the solution at approximately 40° C. Then to this solution were added 0.30 ml of 3.36M tetraisopropoxytitanium (1.0 mmoles) followed by the dropwise addition of 57.0 ml of 1.53M ethylaluminumdichloride (87.5 mmoles). The catalyst slurry was heated for one hour at approximately 60° C. A light brown slurry resulted. The final Mg:Ti and Cl:Mg atomic ratios for this catalyst were 50:1 and 3.5:1 respectively.

B. polymerization

An aliquot of the catalyst prepared in example 16-A above, containing 0.003 mmole of titanium, was used to polymerize ethylene in the same manner as in example 10-B above, except that 0.97 ml of 0.616M triisobutylaluminum was used. The cocatalyst to catalyst atomic ratio of Al:Ti was 200:1. The dried polyethylene weighed 197 g, had a melt index, $I_2$, of 1.6, an $I_{10}/I_2$ ratio of 8.07, and a bulk density of 17.1 lb/ft$^3$ (0.27 g/cm$^3$). The catalyst efficiency was 1,368,000 g PE/g Ti.

C. polymerization

An aliquot of the catalyst prepared in example 16-A above, containing 0.003 mmole of titanium, was used to polymerize ethylene in the same manner as in example 10-B above, except that 0.65 ml of 0.921M triethylaluminum was used. The cocatalyst to catalyst atomic ratio of Al:Ti was 200:1. The dried polyethylene weighed 413 g, had a melt index, $I_2$, of 8.83, an $I_{10}/I_2$ ratio of 8.93, and a bulk density of 19.2 lb/ft$^3$ (0.29 g/cm$^3$). The catalyst efficiency was 2,868,000 g PE/g Ti.

D. polymerization

An aliquot of the catalyst prepared in example 16-A above, containing 0.006 mmole of titanium, was used to polymerize ethylene in the same manner as in example 10-B above, except that 1.9 ml of 0.616M triisobutylaluminum was used and the net hydrogen pressure was adjusted to 100 psi. The cocatalyst to catalyst atomic ratio of Al:Ti was 200:1. The dried polyethylene weighed 179 g, had a melt index, $I_2$, too high to measure, and a bulk density of 16.4 lb/ft$^3$ (0.27 g/cm$^3$). The catalyst efficiency was 621,500 g PE/g Ti.

EXAMPLE 17

A. Catalyst Preparation

To 81.2 g of a 0.616M solution of butylethylmagnesium (50 mmoles) were added 5.87 ml of absolute ethanol (100 mmoles), dropwise so as to maintain the temperature of the solution at approximately 40° C. Then to this solution were added 4.97 ml of 3.36M tetraisopropoxytitanium (16.7 mmoles) followed by the dropwise addition of 73.5 ml of 1.53M ethylaluminumdiclhoride (112.5 mmoles). The catalyst slurry was heated at approximately 60° C. for one hour. A dark brown slurry resulted. The final Mg:Ti and Cl:Mg atomic ratios for this catalyst were 3:1 and 4.5:1 respectively.

B. polymerization

An aliquot of the catalyst prepared in example 17-A above, containing 0.008 mmole of titanium, was used to polymerize ethylene in the same manner as in example 10-B above, except that 1.7 ml of 0.921M triethylaluminum was used. The cocatalyst to catalyst atomic ratio of Al:Ti was 200:1. The dried polyethylene weighed 429 g, had a melt index, $I_2$, of 5.69, an $I_{10}/I_2$ ratio of 8.23, and a bulk density of 20.5 lb/ft$^3$ (0.33 g/cm$^3$). The catalyst efficiency was 1,117,000 g PE/g Ti.

COMPARATIVE EXPERIMENT D

A. Catalyst Preparation

To 5.32 g of powdered anhydrous magnesium ethoxide (46.5 mmoles) was added 50 ml of hexane. While stirring, 5.3 ml of 1.75M tetraisopropyltitanium in hexane (9.3 mmoles) were added to give a colorless supernate. Next, 60.8 ml of 1.53M ethylaluminum dichloride (93.0 mmoles) were added dropwise at about 24° C. A dark brown slurry resulted. The catalyst slurry was heated at about 70° C. for 135 minutes (8100 s) prior to use. The Cl:Mg atomic ratio was 4.0:1 and the Mg:Ti atomic ratio was 5.0:1.

B. Polymerization

An aliquot of catalyst prepared in (D-A) above, containing 0.0103 mmole of titanium was used to polymerize ethylene in the same manner as in Example 15-B) above. The dried polyethylene weighed 92 g, had a melt index, $I_2$, of 2.24 and a bulk density of 15.4 lbs/ft$^3$ (0.2464 g/cm$^3$). The catalyst efficiency was 186,600 g PE/g Ti.

COMPARATIVE EXPERIMENT E

A. Catalyst Preparation

To 5.70 g of magnesium ethoxide (50.0 mmoles) was added 100 ml of dry hexane followed by 0.30 ml of 3 36M tetraisopoxytitanium (1.0 mmole). Then 57 ml of 1.53M ethylaluminum dichloride (87.5 mmoles) were added dropwise. The catalyst slurry was then heated for one hour at about 60° C. The catalyst atomic ratios of Mg:Ti and Cl:Mg were 50:1 and 3.5:1, respectively.

B. Polymerization

An aliquot of catalyst prepared in (E-A) above, containing 0.006 mmole of titanium was used to polymerize ethylene in the same manner as in Example (10-B) above except that 1.9 ml of 0.616M triisobutylaluminum was used. The cocatalyst to catalyst atomic ratio of Al:Ti was 200:1. The dried polyethylene weighed 201 g, had a melt index, $I_2$, of 1.02, an $I_{10}/I_2$ of 10.0, and a bulk density of 14.2 lbs/ft$^3$ (0.23 g/cm$^3$). The catalyst efficiency was 697,900 g PE/g Ti.

C. Polymerization

An aliquot of catalyst prepared in (E-A) above, containing 0.006 mmole of titanium was used to polymerize ethylene in the same manner as in Example (10-B) above except that 1.3 ml of 0.921M triethylaluminum was used. The cocatalyst to catalyst atomic ratio of Al:Ti was 200:1. The dried polyethylene weighed 229 g, had a melt index, $I_2$, of 1.95, an $I_{10}/I_2$ of 9.88, and a bulk density of 14.3 lbs/ft$^3$ (0.23 g/cm$^3$). The catalyst efficiency was 795,910 g PE/g Ti.

D. Polymerization

An aliquot of catalyst prepared in (E-A) above, containing 0.006 mmole of titanium was used to polymerize ethylene in the same manner as in Example (10-B) above except that 2.6 ml of 0.616M triisobutylaluminum was used and the net hydrogen pressure was 100 psi. The cocatalyst to catalyst atomic ratio of Al:Ti was 200:1. The dried polyethylene weighed 109 g, had a melt index, $I_2$, of 53.2, and a bulk density of 18.4 lbs/ft$^3$ (0.30 g/cm$^3$). Due to the high value of the $I_2$, a value for the $I_{10}/I_2$ ratio could not be obtained. The catalyst efficiency was 283,900 g PE/g Ti.

COMPARATIVE EXPERIMENT F

A. Catalyst Preparation

To 5.70 g of magnesium ethoxide (50.0 mmoles) were added 100 ml of dry hexane followed by 4.97 ml of 3.36M tetraisopoxytitanium (16.7 mmoles). Then 73.5 ml of 1.53M ethylaluminum dichloride (112.5 mmoles) were added dropwise. The catalyst slurry was then heated for one hour at about 60° C. The catalyst atomic ratios of Mg:Ti and Cl:Mg were 3:1 and 4.5:1, respectively.

B. Polymerization

An aliquot of catalyst prepared in (F-A) above, containing 0.020 mmole of titanium was used to polymerize ethylene in the same manner as in Example (10-B) above except that 6.5 ml of 0.616M triisobutylaluminum was used. The cocatalyst to catalyst atomic ratio of Al:Ti was 200:1. The dried polyethylene weighed 63 g, had a melt index, $I_2$, of 0.61, an $I_{10}/I_2$ ratio of 10.9, and a bulk density of 12.2 lbs/ft³ (0.20 g/cm³). The catalyst efficiency was 65,800 g PE/g Ti.

C. Polymerization

An aliquot of catalyst prepared in (E-A) above, containing 0.010 mmole of titanium was used to polymerize ethylene in the same manner as in Example (10-B) above except that 2.2 ml of 0.921M triethylaluminum was used. The cocatalyst to catalyst atomic ratio of Al:Ti was 200:1. The dried polyethylene weighed 16 g, had a melt index, $I_2$, of 0.21, an $I_{10}/I_2$ ratio of 9.44, and a bulk density of 10.7 lbs/ft³ (0.17 g/cm³). The catalyst efficiency was 33,300 g PE/g Ti. Table IV summarizes the properties of the polymers prepared in all of the examples and comparative experiments and demonstrates the differences in the $I_{10}/I_2$ ratios. Table V shows the various reagents employed in the examples and comparative experiments.

TABLE IV

| Example or Comparative Experiment # | EFF #PE/#Ti × 10⁻⁶ | $I_2$ | $I_{10}/I_2$ | Bulk Density #/ft³ | Co-Catalyst* | Co-Catalyst to Catalyst Ratio | Net PSI Hydrogen |
|---|---|---|---|---|---|---|---|
| 1-B | 0.529 | 2.21 | 8.0 | 17.2 | ATE | 202.00 | 50 |
| A-B-1 | 0.092 | 0.21 | 6.8 | 9.9 | ATE | 200.16 | 50 |
| A-B-2 | 0.032 | 0.15 | 9.1 | 11.6 | ATE | 199.86 | 50 |
| 2-B | 0.541 | 0.37 | 7.5 | 11.1 | ATB | 193.60 | 50 |
| 3-B | 0.730 | 1.8 | 7.7 | 20.5 | ATB | 200.20 | 50 |
| 3-C | 1.190 | 1.5 | 7.8 | 22.5 | ATE | 207.20 | 50 |
| 4-B | 0.126 | 1.9 | 9.1 | 15.6 | ATE | 50.00 | 50 |
| 5-B | 0.032 | 1.5 | 7.9 | 11.0 | ATE | 200.00 | 50 |
| 6-B | 0.018 | 6.4 | 7.6 | 9.5 | ATE | 50.00 | 50 |
| 7-B | 0.797 | 7.6 | 7.8 | 22.4 | ATE | 200.00 | 50 |
| 8-B | 0.305 | 2.7 | 7.4 | 18.3 | ATE | 200.00 | 50 |
| 9-B | 0.230 | 1.9 | 8.5 | 13.4 | ATE | 50.00 | 50 |
| 10-B | 0.090 | 1.31 | 8.8 | 6.8 | ATE | 202.40 | 70 |
| 11-B | 2.551 | 9.3 | 8.0 | 24.1 | ATE | 201.00 | 70 |
| 12-B | 5.220 | 7.91 | 8.2 | 21.8 | ATE | 202.40 | 70 |
| 13-B | 0.210 | 1.97 | 7.9 | 12.9 | ATE | 202.40 | 70 |
| B-B | 1.297 | 1.41 | 10.2 | 16.6 | ATE | 202.40 | 70 |
| C-B | 0.127 | 1.81 | 7.6 | 13.8 | ATE | 202.40 | 70 |
| 14-B | 0.801 | 1.62 | 8.2 | 14.0 | ATE | 200.10 | 70 |
| 15-B | 0.868 | 4.25 | — | 20.6 | ATE | 196.84 | 70 |
| 16-B | 1.368 | 1.6 | 8.1 | 17.1 | ATB | 199.17 | 70 |
| 16-C | 2.868 | 8.83 | 8.9 | 19.2 | ATE | 199.55 | 70 |
| 16-D | 0.622 | — | — | 16.4 | ATB | 195.06 | 100 |
| 17-B | 0.391 | 1.02 | 8.9 | 15.3 | ATB | 200.20 | 70 |
| 17-C | 1.117 | 5.69 | 8.2 | 20.5 | ATE | 195.71 | 70 |
| D-B | 0.186 | 2.24 | — | 15.4 | ATE | 194.93 | 70 |
| E-B | 0.698 | 1.02 | 10.0 | 14.2 | ATB | 195.06 | 70 |
| E-C | 0.795 | 1.95 | 9.9 | 14.3 | ATE | 199.55 | 70 |
| E-D | 0.284 | — | — | 18.4 | ATB | 266.93 | 100 |
| F-B | 0.066 | 0.61 | 10.9 | 12.2 | ATB | 200.20 | 70 |
| F-C | 0.033 | 0.21 | 9.4 | 10.7 | ATE | 202.62 | 70 |

*ATE is tri-ethylaluminum
*ATB is tri-iso-butylaluminum

TABLE V

| Example Comparative Experiment # | Comp. A R₂Mg of R₂Mg · xMeR'X | Comp. A MeR'X of R₂Mg · xMeR'X | Comp. B (Alcohol) | Comp. C (Reducing Aluminum Halide) | Comp. D (Transition Metal Compound) |
|---|---|---|---|---|---|
| 1 | BEM | ATB | NPA | EADC | TIPT |
| A (No Heat) | BEM | ATB | NPA | EADC | TIPT |
| 2 | DNHM | ATB | NPA | EADC | TIPT |
| 3 | BEM | ATB | NPA | EADC | TIPT |
| 4 | BEM | ATB | NPA | EADC | TIPT |
| 5 | BEM | ATB | NPA | EADC | TIPT |
| 6 | BEM | ATB | NPA | EADC | TIPT |
| 7 | BEM | ATB | NPA | EADC | TICL₄ |
| 8 | BEM | ATB | NPA | EADC | TICL₄ |
| 9 | BEM | ATB | NPA | EADC | TICL₄ |
| 10 | BOM | ATO | NDA | EADC | TIPTD |

TABLE V-continued

| Example Comparative Experiment # | Comp. A R₂Mg of R₂Mg · xMeR'X | Comp. A MeR'X of R₂Mg · xMeR'X | Comp. B (Alcohol) | Comp. C (Reducing Aluminum Halide) | Comp. D (Transition Metal Compound) |
|---|---|---|---|---|---|
| 11 | BOM | ATE | METH | EADC | TNBT |
| 12 | DNHM | ATB | NPA | EADC | TIPT |
| 13 | DNHM | ATB | NPA | EADC | TIPT |
| B | MGETOH | | | EADC | TIPT |
| C | MGETOH | | | EADC | TIPT |
| 14 | BEM | ATB | NPA | IBADC | TIPT |
| 15 | BEM | ATB | ETOH | EADC | TIPT |
| 16 | BEM | | ETOH | EADC | TIPT |
| 17 | BEM | | ETOH | EADC | TIPT |
| D | MGETOH | | | EADC | TIPT |
| E | MGETOH | | | EADC | TIPT |
| F | MGETOH | | | EADC | TIPT |

*BEM IS BUTYL-ETHYL-MAGNESIUM
BOM IS BUTYL-OCTYL-MAGNESIUM
DNHM IS DI-n-HEXYL-MAGNESIUM
MGETOH IS SOLID MAGNESIUM ETHOXIDE
ATE IS TRI-ETHYLALUMINUM
ATO IS TIR-OCTYL-ALUMINUM
ATB IS TRI-ISO-BUTYLALUMINUM
NPA IS N—PROPYL ALCOHOL
METH IS METHYL ALCOHOL
ETOH IS ETHYL ALCOHOL
EADC IS ETHYL-ALUMINUM DICHLORIDE
IBADC IS ISO-BUTYL-ALUMINUM DICHLORIDE
EASC IS ETHYL-ALUMINUM SEQUICHLORIDE
TIPT IS TETRA-ISO-PROPYL-TITANATE
TIPTD IS TETRA-ISO-PROPYL-TITANATE DECOMER
TICL₄ IS TITANIUM TETRA CHLORIDE
TNBT IS TETRA-N—BUTYL-TITANATE

I claim:

1. In a process for the polymerization of one or more polymerizable ethylenically unsaturated monomers containing one or more polymerizable α-olefins under Ziegler polymerization conditions wherein the polymerization is conducted in the presence of a transition metal-containing catalyst and at least one aluminum cocatalyst or activator compound represented by the formula Al(R³)$_{3-a}$(X')$_a$ wherein R³ is independently a hydrocarbyl group; X' is a halogen; and a has a value of from zero to 2; the improvement which comprises employing as the transition metal-containing catalyst an unseparated catalytic product resulting from (I) admixing in an inert hydrocarbon diluent and in an atmosphere which excludes moisture and oxygen (A) at least one hydrocarbon soluble organomagnesium material represented by the formula R₂Mg.xAl(R')₃ wherein each R is independently a hydrocarbyl group having from 1 to about 20 carbon atoms, each R' is independently hydrogen or a hydrocarbyl or hydrocarbyloxy group having from 1 to about 20 carbon atoms; and x has a value zero to about 2; and (B) at least one organic hydroxyl-containing material represented by the formula ROH wherein R is a hydrocarbyl group having from 1 to about 20 carbon atoms thereby forming a complex or reaction product and subsequently adding:

(C) at least one reducing halide source represented by the formula Al(R³)$_{3-m}$X$_m$ wherein each R³ is independently hydrogen or a hydrocarbyl group having from 1 to about 20 carbon atoms, X is a halogen and m has a value from 1 to 2; and (D) at least one Titanium (Ti) compound represented by the formula Ti(OR")4; R" is hydrogen or a hydrocarbyl group having from 1 to about 20 carbon atoms; and (II) heating the resultant mixture at a temperature of from about 35? C. up to the boiling point of the inert hydrocarbon diluent, for a time to permit substantial reaction of the resultant mixture as indicated by a change in color of the mixture; and wherein (1) the components are added in the order (A+B), (C) and (D) or (A+B), (D) and (C); and the components are employed in quantities so as to provide the following atomic ratios Mg:Ti of from about 3:1 to about 50:1; Cl:Mg of from about 2:1 to about 5:1; and the OH:total number of hydrocarbyl groups attached to a metal atom in component (A) is from about 0.8:1 to about 1.2:1;

2. A process of claim 1 wherein (1) in component (A) each R and R' is a hydrocarbyl group having from 1 to about 10 carbons, and x has a value of from about 0.2 to about 2;

(2) component (B) is an alcohol having from 1 to about 10 carbon atoms;

(3) in component (C) each R³ is independently a hydrocarbyl group having from 1 to about 10 carbons and X is chlorine;

(4) the atomic ratio of Cl:Mg is from about 3.5:1 to about 4.5:1; and (5) the ratio of OH groups in components (B):total number of hydrocarbyl groups attached to a metal atom in component (A) is from about 0.8:1 to about 1.05:1.

3. The process of claim 2 wherein (1) component (A) is a complex of di-n-hexyl magnesium and triisobutylaluminum, a complex of butylethylmagnesium and triisobutylaluminum, a complex of butyloctyl magnesium and triethylaluminum, a complex of butylethyl magnesium and triethylaluminum, or butyl ethyl magnesium;

(2) component (B) is n-propyl alcohol;

(3) the atomic ratio of Mg:Ti is from about 5:1 to about 20:1;

(4) component (C) is ethylaluminumdichloride; and (5) component (D) is tetraisopropoxytitanium.

4. A process of claims 1, 2 or 3 wherein ethylene or a mixture of ethylene and one or more α-olefins having from 3 to about 10 carbon atoms are polymerized under slurry polymerization conditions.

5. A process of claim 4 wherein a mixture of ethylene and one or more of butene-1, hexene-1 or octene-1 are polymerized.

6. A process of claims 1, 2 or 3 wherein ethylene, or a mixture of ethylene and one or more α-olefins having from 3 to about 10 carbon atoms are polymerized under solution polymerization conditions.

7. A process of claim 6 wherein a mixture of ethylene and one or more of butene-1, hexene-1 or octene-1 are polymerized.